United States Patent [19]

Ichihashi et al.

[11] Patent Number: 4,623,905
[45] Date of Patent: Nov. 18, 1986

[54] LIQUID SUPPLY APPARATUS

[75] Inventors: Hiroo Ichihashi; Shigeo Toganoh; Yohji Matsufuji, all of Tokyo, Japan

[73] Assignee: Canon Kabushiki Kaisha, Tokyo, Japan

[21] Appl. No.: 559,933

[22] Filed: Dec. 9, 1983

[30] Foreign Application Priority Data

Dec. 15, 1982 [JP] Japan .................. 57-219526
Dec. 15, 1982 [JP] Japan .................. 57-219527

[51] Int. Cl.⁴ .................. G01D 15/16; G01F 11/00
[52] U.S. Cl. .................. 346/140 R; 222/318
[58] Field of Search .......... 346/140 PD, 140 B, 75; 400/126; 417/412; 239/331, 332; 222/318, 333, 383, 385

[56] References Cited

U.S. PATENT DOCUMENTS

| 2,849,159 | 8/1958 | Kaufmann | 417/412 |
|---|---|---|---|
| 3,366,280 | 1/1968 | Sampson | 222/333 |
| 4,253,103 | 2/1981 | Heinzl | 400/126 |
| 4,263,602 | 4/1981 | Matsumoto | 222/318 |
| 4,320,406 | 3/1982 | Heinzl | 346/140 PD |
| 4,462,037 | 7/1984 | Bangs | 346/75 |
| 4,464,668 | 8/1984 | Komai | 346/75 |
| 4,496,959 | 1/1985 | Frerichs | 346/75 |

Primary Examiner—E. A. Goldberg
Assistant Examiner—Mark Reinhart
Attorney, Agent, or Firm—Fitzpatrick, Cella, Harper & Scinto

[57] ABSTRACT

A liquid supply apparatus is characterized by the provision of pumping means for supplied liquid interposed between a liquid supply portion and a portion to be supplied with liquid, a first valve mechanism having a small resistance in a forward direction, and a second valve mechanism having a high checking characteristic.

17 Claims, 6 Drawing Figures

LIQUID SUPPLY APPARATUS

BACKGROUND OF THE INVENTION

1. Field of the Invention

This invention relates to a liquid supply apparatus, and in particular to improvements in a liquid replenishing mechanism.

2. Description of the Prior Art

Some conventional liquid supply apparatuses, for example, apparatuses for supplying ink to recording means in recording apparatuses, are designed such that the supply of ink to the ink reservoir unit thereof is effected by a cartridge type ink supply tank so that the liquid level of the ink in the ink reservoir unit can be maintained constant and the ink supply pressure always becomes constant.

In such apparatuses, the supply tank itself is adapted to be interchanged if the ink to be supplied therein is exhausted. With such ink supply apparatuses, it has often been the case that when the ink supply tank is interchanged, the operator's hands are stained by ink or the instruments around the tank are stained by ink, and the ink supply tank has been inconvenient to handle.

As a kind of the aforementioned recording apparatus, there has been proposed an on-demand type ink jet printer in which drops of ink are discharged from a nozzle by a pressurization pulse to thereby effect recording. In such a printer, when the pressurization pulse is not applied, ink must not be discharged from the nozzle although, ink must be quickly discharged in response to a pressurization pulse. Therefore it is not suitable to pressurize the ink as by a pump and supply it to the nozzle and the ink is supplied chiefly by utilization of capillary phenomenon. Therefore, when the liquid chamber of the nozzle becomes empty during apparatus assembling work or maintenance and adjustment work, directing the ink in the ink tank to the nozzle and filling the nozzle with the ink is required.

For this reason, in some apparatuses, a pumping mechanism is provided in the ink passage from the ink tank to the nozzle of the head to effect fill the nozzle. In such apparatuses, a check valve is usually provided to prevent backflow of the ink in the ink passage when the ink is pressurized by the pump.

However, a good checking characteristic and a small resistance in a forward direction are generally required of the check valve used in such apparatuses. However, the check valve generally has a good checking characteristic, but its resistance in the forward direction of the liquid supply path in the on-demand type printer is too great and thus, it has been difficult to construct a proper liquid supply mechanism.

SUMMARY OF THE INVENTION

In view of the above-noted disadvantages peculiar to the prior art, it is an object of the present invention to provide a liquid supply apparatus in which the operability of the mounting and dismounting operation of the liquid supply tank is improved.

It is another object of the present invention to provide a liquid supply apparatus in which proper pressurization may be effected on the liquid supplied from a liquid supply portion to a portion to be supplied with liquid.

It is still another object of the present invention to provide a liquid supply apparatus provided with pumping means interposed between the liquid supply portion and the portion to be supplied with liquid, a first valve mechanism having a small resistance in a forward direction, and a second valve mechanism having a high checking characteristic.

It is yet still another object of the present invention to provide a liquid supply apparatus provided with a liquid supply portion storing therein the liquid to be supplied to the portion to be supplied with liquid, a liquid replenishing portion storing therein the liquid to replenish the liquid supply portion, a liquid replenishing path from the liquid replenishing portion to the liquid supply portion, and an air passage formed separately from the liquid replenishing path and communicating the liquid supply portion with the liquid replenishing portion.

The invention will become fully apparent from the following detailed description thereof taken in conjunction with the accompanying drawings.

BRIEF DESCRIPTION OF THE DRAWINGS

FIGS. 4 (2) and 4 (3) are cross-sectional views of the distributor of FIG. 4 (1) taken along lines 4-2 and 4-3, respectively, of FIG. 4 (1).

DESCRIPTION OF THE PREFERRED EMBODIMENT

Figure 1:
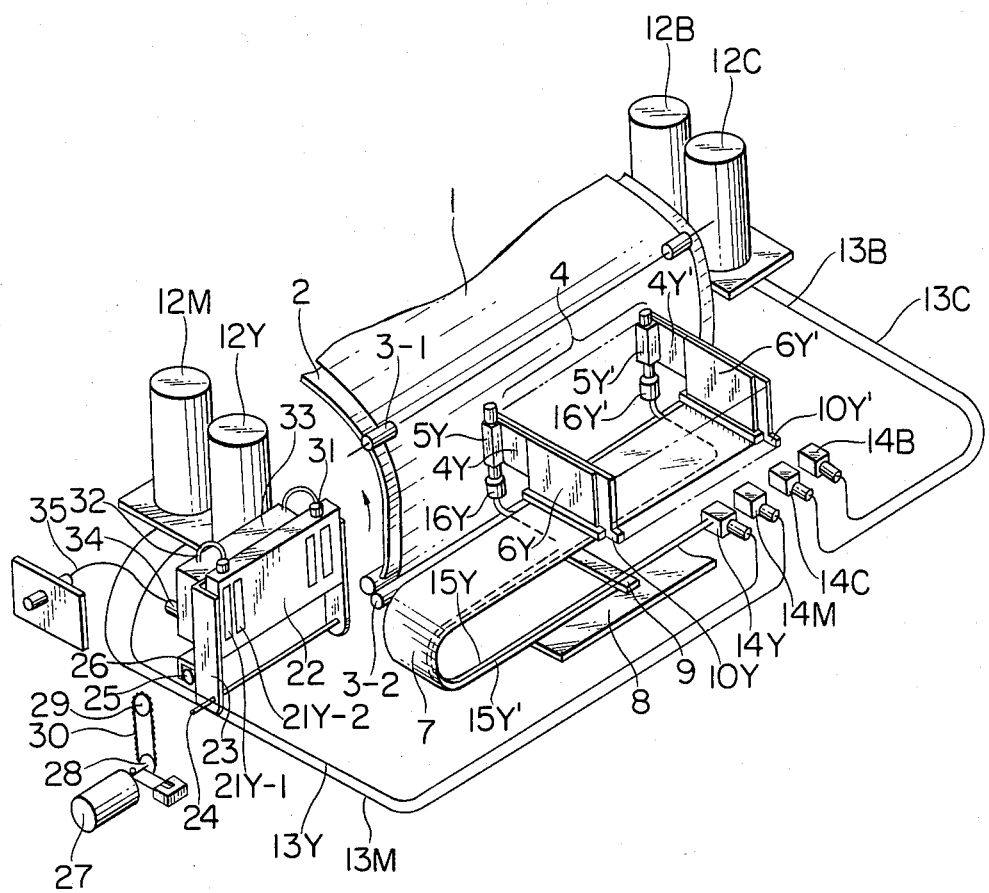
FIG. 1 schematically shows the construction of an embodiment of the present invention.

Referring to FIG. 1 which schematically shows the construction of a multicolor ink jet printer to which the present invention is applied, reference numeral 1 designates recording paper, reference numeral 2 denotes a platen, and reference numeral 3-1 designates a pinch roller for urging the recording paper 1 against the platen 2. The recording paper 1 may be moved in the minor scanning direction (the direction of the arrow) on the platen 2 by rotation of a paper feed roller 3-2. Reference numeral 4 designates a group of head units comprising multinozzle ink jet heads disposed in opposed relationship with the recording paper 1. Head units 4Y, 4M, 4C, 4B, 4B', 4C', 4M' and 4Y' which discharge inks of respective colors in the order of Y (yellow), M (magenta), C (cyan), B (black), B, C, M and Y in the major scanning direction from the left-hand side of FIG. 1 are arranged at predetermined intervals. In FIG. 1, only the head units 4Y and 4Y' on the opposite sides are shown. Each head unit has a plurality of, say, 128 nozzles arranged at predetermined intervals in the minor scanning direction and discharges ink of a distinct color toward the recording paper 1. Reference numeral 5 designates a liquid chamber communicating with each nozzle. Reference numeral 6 denotes a matrix circuit for selectively driving each nozzle, reference numeral 7 designates a flexible cable, and reference numeral 8 denotes a head driving circuit. A head driving signal may be supplied from the head driving circuit 8 to the matrix circuit 6 through the cable 7. Reference numeral 9 designates a pressure plate for connecting and fixing the output terminal of the head driving circuit 8 and each terminal of the flexible cable 7. The matrix circuit 6 is disposed in each unit, and the group of head units 4 is fixed to a carriage, not shown, by a head fixing plate 10 (see FIG. 3). The carriage may be guided along a slide shaft by well-known drive means such as a driving belt and thereby reciprocally moved in a major scanning direction on the recording paper 1.

Description will now be made of an ink supply system for supplying ink to each head unit.

Reference characters 12Y, 12M, 12C and 12B designate ink reservoirs stering therein inks of colors Y, M, C and B, respectively, and reference characters 13Y, 13M, 13C and 13B denote ink pipes communicating at one end thereof with the ink tanks. Reference characters 14Y, 14M, 14C and 14B designate distributors communicating with the other ends of the ink pipes 13Y–13B, respectively. Inks of distinct colors may be supplied to the distributors 14Y–14B through the ink pipes 13Y–13B, respectively. Reference characters 15Y and 15Y' designate ink pipes communicating at one end thereof with the distributor 14Y, and reference characters 16Y and 16Y' denote liquid entry couplers for communicating the other ends of the ink pipes 15Y and 15Y' with the liquid chambers 5Y and 5Y', respectively, of the head units 4Y and 4Y'. The yellow ink supplied to the distributor 14Y, as will later be described, may be distributed into the ink pipes 15Y and 15Y' and supplied to the liquid chambers 5Y and 5Y' through the ink pipes 15Y and 15Y', respectively. Although not shown, under a similar construction, inks of distinct colors may be supplied from the distributors 14M, 14C and 14B to the corresponding head units 4M, 4M', 4C, 4C', 4B and 4B'.

A recovering system will now be described.

Reference character 21Y-1 designates a rubber cap and reference character 21Y-2 denotes a cleaning pad, and a number of sets of these two members corresponding to the head units 4Y-4Y', namely, eight sets, are arranged on a holder 22. In a condition in which the group of head units 4 has returned to a first home position, the heads of the head units 4Y-4Y' are made to confront the rubber caps 21Y-1 - 21Y'-1, and in a condition in which the group of head units 4 has returned to a second home position, the heads are made to confront the cleaning pads 21Y-2 - 21Y'-2. Reference numeral 23 designates a support plate for supporting the holder 22, and reference numeral 24 denotes a fixed shaft for pivotably supporting the support plate 23. Reference numeral 25 designates an eccentric roller. The side surface of the support plate 23 has a bearing portion 26 designed to engage the roller 25, and the support plate 23 is adapted to pivot in a predetermined range of angle about the fixed shaft 24 by rotation of the eccentric roller 25. Reference numeral 27 designates a motor, reference numeral 28 denotes a pulley secured to the output shaft of the motor, reference numeral 29 designates a pulley secured to the rotary shaft of the eccentric roller 25, and reference numeral 30 denotes a drive force transmitting belt passed over the pulleys 28 and 29. Under such a construction, the motor 27 may be energized to rotate the eccentric roller 25.

The position of the support plate 23 prescribed by the eccentric roller 25, that is, the surface position of the rubber caps 21Y-1–21Y'-1 and the cleaning pads 21Y-2–21Y'-2 is made to lie on the same plane as the recording paper 1 or on a plane retracted therefrom relative to the group of head units 4 when the group of head units 4 is not in its home position, and is made to bear against the surface of the heads of the group of head units 4 with a predetermined pressure when the group of head units 4 has returned to its home position. As a result, when the group of head units has returned to the first home position, the nozzles are closed by the rubber caps 21Y-1–21Y'-1 and thus, occurrence of evils such as desiccation of the tip ends of the nozzles and entry of dust or the like thereinto may be avoided. When the group of head units has returned to the second home position, the tip ends of the nozzles of the head units 4Y–4Y' are cleaned by the cleaning pads 21Y-2–21Y'-2 and thus, an evil such as the instruments around the nozzles being contaminated by drops of ink unnecessarily extruded from the tip ends of the nozzles may be avoided.

The details of each constructional region will now be described.

Figure 2:
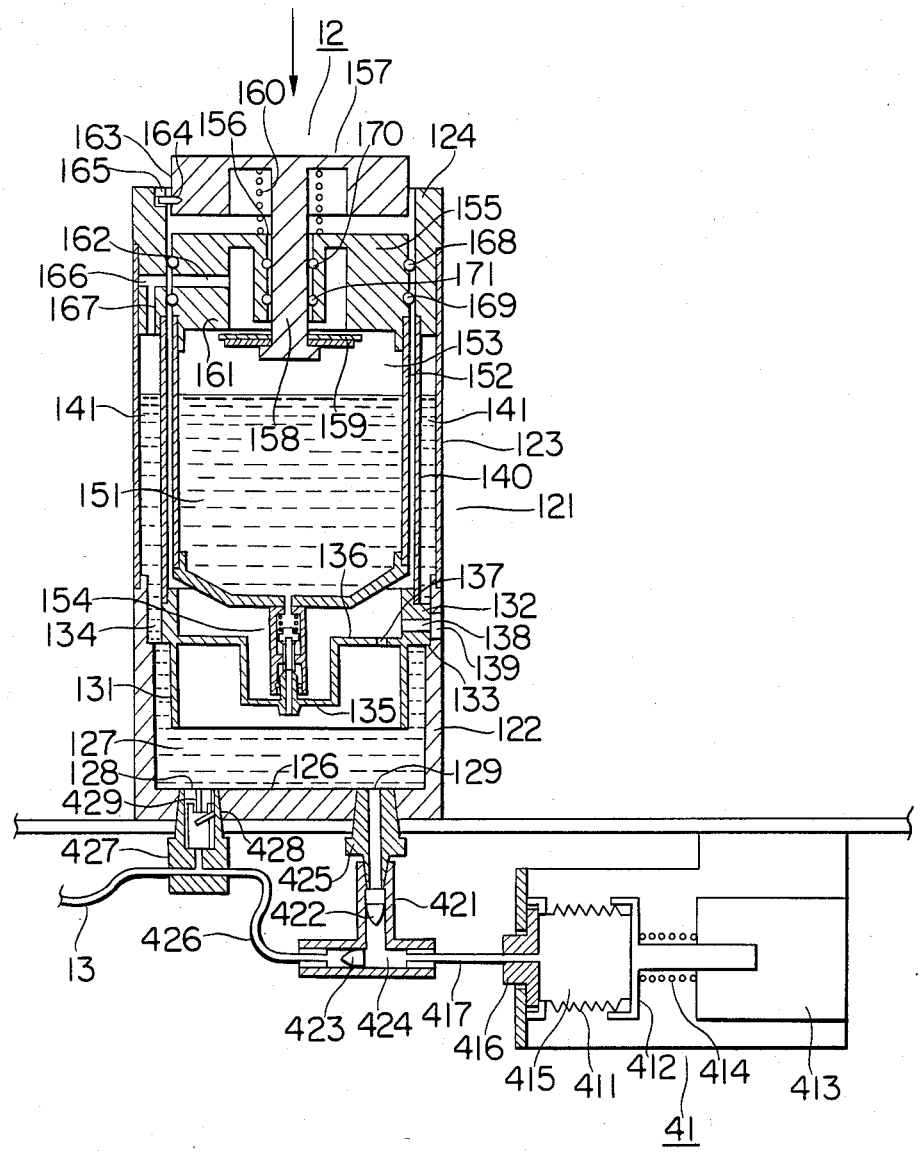
FIG. 2 shows the constructions of an ink reservoir unit and a plunger pump in the ink supply system of FIG. 1.

FIG. 2 shows the ink reservoir unit 12 (12Y–12B) of the ink supply system in the printer of FIG. 1 and an ink pump (plunger pump) for pressurizing supplied ink for the loading or recovery of ink into the ink jet heads.

In the ink reservoir unit 12, reference numeral 121 designates a main tank. Reference numerals 122, 123 and 124 denote circular rings constituting the outer shell of the main tank. The circular ring 122 has a bottom plate 126 and forms an ink reservoir 127. The bottom plate 126 is formed with ink supply holes 128 and 129 in which check valves are fitted as will later be described. Reference numeral 131 designates a circular ring which constitutes a main tank lid and which has an outside diameter smaller than the inside diameter of the circular ring 122. The circular ring 131 is inserted in the circular ring 122 so as to be coaxial with the outer shell defined by the elements 122–124. The outer peripheral wall of the circular ring 131 is formed with protrusions 132 at predetermined intervals, and these protrusions are restrained by a flange portion 133 formed on the inner peripheral wall of the circular ring 122. As a result, a passage 134 communicating with the ink reservoir 127 is formed by the inner peripheral wall of the circular ring 122 and the outer peripheral wall of the circular ring 131. Further, the circular ring 131 has a lid portion 136 formed with a downwardly protruding surface 135 centrally thereof, and this lid portion 136 is formed with a communication hole 137, from which the atmosphere may be introduced into the ink reservoir 127 through a communication hole 138 formed in the protrusion 132 and an atmosphere hole 139 formed in the circular ring 122 of the outer shell. One of couplers for introducing ink from a supplemental tank to be described into the ink reservoir 127 is disposed on the protruded surface 135 of the lid portion 136 coaxially with the circular ring 131.

Reference numeral 140 designates a circular ring constituting the inner shell of the main tank. One end of the circular ring 140 is fitted to the circular ring 131 and the other end of the circular ring 140 is fitted to the circular ring 124, and a passage 141 communicating with the passage 134 is formed between the circular ring 140 and the outer shell.

Designated by 151 is a supplemental tank which is removably mountable into the tank 121 in the direction of the arrow. In FIG. 2, the supplemental tank 151 is shown mounted in the main tank 121. Reference numeral 152 designates an outer shell forming the ink reservoir 153 of the supplemental tank. One of couplers 154 for introducing the ink in the ink reservoir 153 into the main tank is disposed in the lower end portion of the outer shell 152, and when the supplemental tank is mounted, one of the couplers 154 disposed on the main tank lid 131 as shown is fitted to the supplemental tank.

A through-hole 156 is formed in the rear end portion 155 of the outer shell 152. Reference numeral 157 designates a supplemental tank lid having a sliding shaft 158 inserted in the through-hole 156. A rubber packing 159 is secured to the tip end portion of the sliding shaft 158 which projects into the ink reservoir 153, and a spring 160 is interposed between the supplemental tank lid 157 and the rear end portion 155 of the outer shell 152 to urge the lid 157 away from the rear end portion 155. Thus, when the supplemental tank 151 is not mounted, the rubber packing 159 is brought into intimate contact with a flange portion 161 formed on the rear end portion 155. Accordingly, a communication hole 162 formed in the rear end portion 155 and the ink reservoir 153 can be isolated from each other, so that the supplemental ink in the ink reservoir 153 never leaks to the outside through the communication hole 162.

Pins 164 are secured to the outer peripheral wall 163 of the supplemental tank lid 157 at predetermined intervals and pin-receiving grooves 165 are formed in the end portion of the inner peripheral wall of the circular ring 124 of the main tank 121. These grooves 165 extend in the vertical direction (the direction perpendicular to the plane of the drawing sheet) to form pin-securing portions. Thus, when the supplemental tank 151 is inserted in the main tank 121, if the supplemental tank lid 157 is urged and moved against the force of the spring 160 so that the pins 164 are inserted in the pin-receiving grooves 165 and further, the supplemental tank lid 157 is rotated about the axis thereof toward the pin-securing portions of the grooves 165, the pins 163 are restrained on the pin-securing portions and therefore, the supplemental tank lid 157 is held with the rubber packing 159 being spaced apart from the flange portion 161 as shown. As a result, the ink reservoir 153 communicates with the communication hole 162. A communication hole 166 communicating with the communication hole 162 is formed in the circular ring 124 of the main tank 121, and further, a communication hole 167 communicating with the communication hole 166 with the passage 141 is formed in the circular ring 124.

Designated by 168, 169 and 170, 171 are o-rings which respectively seal the space between the inner peripheral wall of the circular ring 124 of the ink tank and the supplemental tank 151 inserted therein and the space between the through-hole 156 of the supplemental tank and the sliding shaft 158.

In the ink reservoir unit 12 constructed as described above, when the supplemental tank 151 is inserted in the main tank 121, an ink passage leading from the ink reservoir 153 of the supplemental tank through the coupler 154 to the ink reservoir 127 in the main tank is formed. Also, an air passage leading from the atmosphere hole 139 through the communication hole 138, the communication hole 137, the ink reservoir 127 in the main tank, the communication hole 167, the communication hole 166 and the communication hole 162 of the supplemental tank to the ink reservoir 153 in the supplemental tank is formed. As a result, the ink filling the ink reservoir 153 of the supplemental tank flows into the ink reservoir 127 in the main tank 121. The inflow of the ink is continued and the liquid level of the ink having flowed into the ink reservoir 127 of the main tank gradually rises and the liquid level of the ink is held at a position as shown, thus assuming a balanced state. At this time, the following equation of balance is obtained:

$$P1 = P2 + h\rho g,$$

where P1 is the air pressure of the void in the reservoir 127 of the main tank, P2 is the air pressure of the void in the ink reservoir 153 of the supplemental tank, h is the difference between the liquid level of the ink in the ink reservoir 127 and the liquid level of the ink in the passage 141, and $\rho$ is the density of the ink.

Since the ink reservoir 127 is in communication with the atmosphere, P1 is equal to the atmospheric pressure.

Thereafter, even if the ink in the ink reservoir 127 of the main tank is supplied to the ink jet head through the supply hole 128 and the liquid level of the ink in the passage 141 falls temporarily, the air from the atmosphere hole 139 is supplied into the ink reservoir 153 of the supplemental tank through the passage 141 and a predetermined amount of ink again flows into the main tank.

In this manner, the liquid level of the ink in the ink reservoir 127 of the main tank is kept constant as long as the replenishment of the ink is continued. Accordingly, if the nozzle position of the ink jet head is kept at a predetermined level relative to this liquid level of the ink, the ink tank side can be kept in a predetermined negative pressure condition relative to the nozzle side.

Thus, in the ink reservoir unit in the present embodiment, interchange of ink and air is not effected through the coupler 154 with the inserted supplemental tank as has heretofore been done, but only the supply of ink is effected through the coupler 154 and air is supplied through an air passage provided separately. As a result, only the ink flows through the coupler 154 and therefore, the diameter of the passage therein can be made small. Also, the stroke of this coupler during the insertion of the supplemental tank can be made small, thus avoiding the drawback of a great amount of ink adhering to such coupled portion during the mounting or dismounting of the supplemental tank. Further, the tip end of the coupler of the supplemental tank is not in contact with the liquid surface of the ink in the main tank and therefore, it never happens that a great amount of ink adheres to the tip end of the coupler when the supplemental tank is removed. Further, the diameter of the hole of the coupler can be made smaller as described above and therefore, it neither happens that the residual ink drops from the tip end of the coupler due to the surface tension of the ink when the supplemental tank is removed. In addition, the air passage provided separately can be freely formed to a size which enables suitable circulation of the air.

The ink pump 41 will now be described by reference again to FIG. 2. Reference numeral 411 designates bellows, reference numeral 412 denotes an actuator, reference numeral 413 designates a plunger, and reference numeral 414 denotes a return spring interposed between the actuator 412 and the plunger 413. In the deenergized condition of the plunger 413, the actuator 412 is biased to a position in which it compresses the bellows a predetermined amount, by the spring force of the return spring 414. Reference numeral 415 designates an ink chamber formed by the bellows 411. This ink chamber 415 is in communication with an ink pipe 417 disposed in a pipe holder 416. Reference numeral 421 denotes a check valve comprising two duck bill type check valves 422 and 423 connected together in a forward direction as shown. The liquid chamber 424 of the check valve 421 is in communication with the ink pipe 417. Reference numeral 425 designates a supply pipe having one end thereof fitted into the ink supply hole 129 in the bottom plate of the main tank and the other end thereof connected to the inflow side of the check valve 421. A by-pass pipe 426 is connected to the outflow side of the check valve 421. Reference numeral 427 denotes a check valve fitted in the supply hole 128 in the bottom plate 126 of the main tank. A valve 428 maintains its inclined state as shown to cause the ink to circulate in the forward direction and, when a backflow occurs, this valve 428 becomes seated on a valve seat 429 to prevent the backflow. This check valve 427, unlike the duck bill type check valves 422 and 423, has a characteristic that the resistance in the forward direction is small. Connected to the outflow side of the check valve 427 are the by-pass pipe 426 and the ink pipe 13.

Normal ink supply passes from the ink reservoir 127 to the head units 4Y-4Y' through the check valve 427 and the ink pipe 13 in succession. In this manner, the ink is supplied through the check valve 427 having a small resistance in the forward direction and therefore, ink supply toward the ink jet heads can be accomplished under a suitable supply pressure.

On the other hand, when the ink jet heads are to be filled with ink such as when ink is forcibly introduced into the liquid chambers 5Y-5Y' (see FIG. 1) of the ink jet heads if the liquid chambers have become empty, ink supply is effected under a predetermined pressure in the following manner. The plunger 413 is energized to attract the actuator 412 against the spring force of the return spring 414. As a result, the volume of the liquid chamber 415 is increased and therefore, the ink in the ink reservoir 127 of the main tank is sucked from the ink supply hole 129 into the liquid chamber 415 through the check valve 422, the liquid chamber 424 and the ink pipe 417. At that time, the ink in the ink pipe 13 does not flow back because the duck bill type check valve 423 is interposed between the ink pipe 13 leading to the head units 4Y-4Y' and the ink pipe 417 providing a good checking characteristic.

When the plunger 413 is then deenergized again, the actuator 412 is returned to its original position by the return force of the return spring 414. As a result, under a predetermined pressure, the ink sucked as described above is supplied toward the liquid chambers 5Y-5Y' of the head units 4Y-4Y' through the ink pipe 417, the check valve 424, the by-pass pipe 426 and the ink pipe 13Y. Thus, recovery of the heads is effected. At this time, the ink does not flow from the ink pipe 417 back to the ink reservoir 127 because the duck bill type check valve 422 is interposed between the ink pipe 417 and the ink supply pipe 425 leading to the ink reservoir 127 providing a high checking characteristic.

Thus, in the present embodiment, in effecting ink supply under the predetermined pressure by the ink pump as pressurizing means in the ink supply system, use is made of a combination of a check valve having a high checking characteristic and a check valve having a small resistance in the forward direction, whereby even during the normal ink supply or during the ink supply under the pressure by the pump, proper ink supply can always be accomplished. That is it is possible to correct the disadvantage of the duck hill type check valve that its checking characteristic is excellent but its resistance in the forward direction is too great, thereby constructing an ink supply mechanism having a required checking characteristic and a required resistance in the forward direction.

During the pressurization by the pump as described above, the group of head units 4 is returned to the second home position and the nozzles of the head units are brought into intimate contact with the cleaning pads 21Y-2-21Y'-2 to cause these cleaning pads to absorb the ink overflowing from the nozzles as by being excessively supplied to the liquid chambers 5Y-5Y' of the heads.

Figure 3:
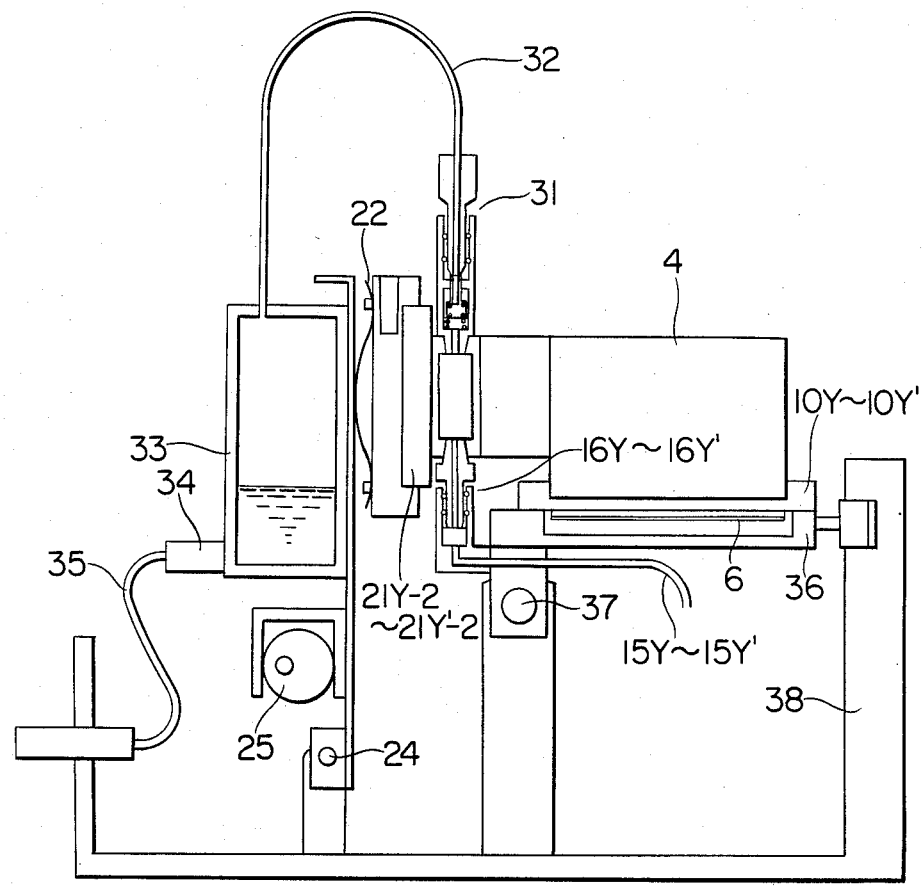
FIG. 3 shows the construction of the head recovering system of FIG. 1.

FIG. 3 shows the recovering system in such condition. In FIG. 3, reference character 31(31Y-31Y') designates discharge couplers which communicate suction pipes 32(32Y-32Y') with the liquid chambers 5Y-5Y', respectively. Reference numeral 33 denotes a drain tank in which is stored the ink discharged from the liquid chambers 5Y-5Y' through the suction pipe 32. Reference numeral 34 designates a coupler which communicates a waste liquid pipe 35 with the drain tank 33. The ink stored in the drain tank 33 may be discharged through the waste liquid pipe 35. In FIG. 3, reference numerals 36, 37 and 38 respectively designate the carriage of the group of head units 4 not shown in FIG. 1, the sliding shaft of the carriage and a carriage guide.

Figure 4:
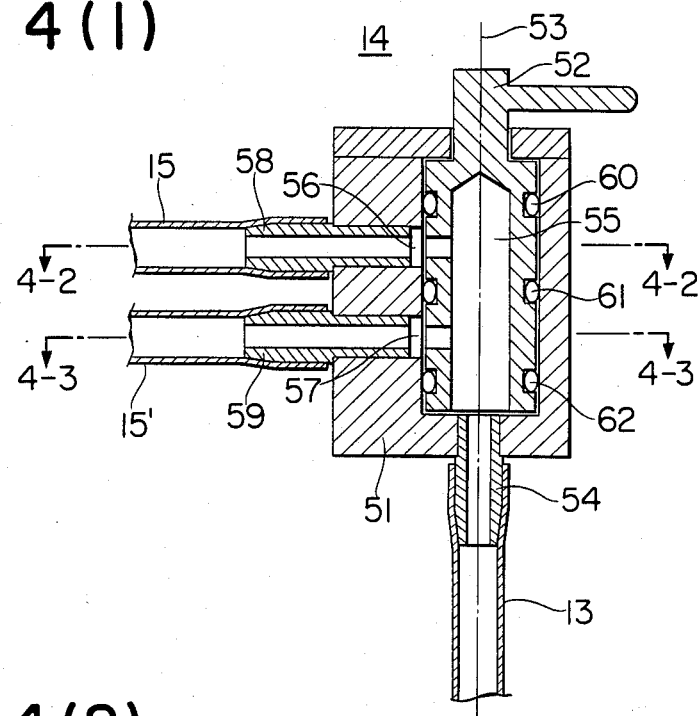
FIG. 4 (1) is a cross-sectional view showing the distributor of FIG. 1.
Figure 4:
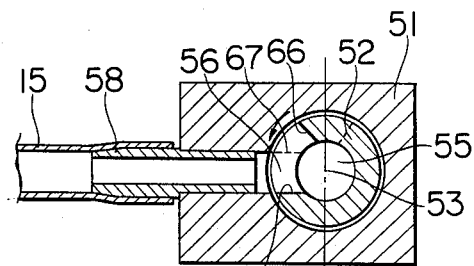
Figure 4:
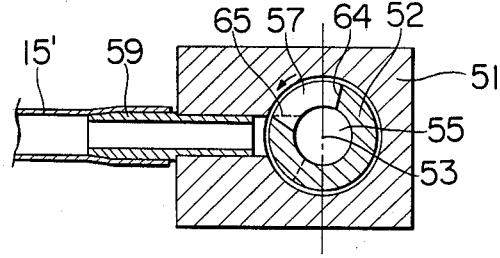

FIG. 4 shows a distributor 14 (14Y-14B) for distributing into the ink pipes 15Y, 15Y', 15M, 15M', 15C, 15C' and 15B, 15B' the ink supplied from the ink reservoir units 12 (12Y-12B) through the ink pipes 13 (13Y-13B).

FIG. 4 (1) shows a longitudinal cross-section of the distributor. In FIG. 4 (1), reference numeral 51 designates a housing, and reference numeral 52 denotes a change-over valve fitted in this housing for rotation about an axis 53. Reference numeral 54 designates a communication pipe extending through the housing 51 to communicate the liquid chamber 55 of the change-over valve 52 with the ink pipe 13. Reference numerals 56 and 57 designate outflow holes for permitting outflow of the ink from the liquid chamber 55, reference numeral 58 denotes a communication pipe which communicates the outflow hole 56 with the ink pipe 15 (15Y-15B) when the changeover valve rotates by a predetermined amount, and reference numeral 59 designates a communication pipe which communicates the outflow hole 57 with the ink pipe 15' (15Y'-15B') when the change-over valve 52 rotates by a predetermined amount. Reference numerals 60, 61 and 62 denote O-rings which seal the space between the housing 51 and the change-over valve 52.

FIGS. 4 (2) and 4 (3) show the positional relation between the outflow hole 56 and the communication pipe 58 and between the outflow hole 57 and the communication pipe 59, respectively. As can be seen from these Figures, the outflow holes 56 and 57 are formed at positions shifted by predetermined angles about the axis 53, so that when the end surface 63 of the outflow hole 56 is in the position as shown in FIG. 4 (2), the liquid chamber 55 and the communication pipe 59 are shut off as shown in FIG. 4 (3). On the other hand, when the change-over valve 52 rotates in the direction of arrow from its position shown and the end surface 64 of the outflow hole 57 comes to a position 65 indicated by broken line in FIG. 4 (3), the liquid chamber 55 and the communication pipe 58 are shut off. As a result, as the change-over valve 52 is rotated in the direction of the arrow from its position shown, the outflow hole 57 gradually changes from its fully closed condition to its fully open condition.

On the other hand, as regards the outflow hole 56, after its fully open condition is continued, the end surface 66 comes to a position 67 indicated by broken line in FIG. 4 (2), and thereafter the opening area of the outflow hole 56 decreases gradually. Thereafter, when the end surface 64 of the hole 57 comes to the broken-line position 65 as shown in FIG. 4 (3), the outflow hole 56 becomes fully closed.

In the distributor 14 thus constructed, if the change-over valve 52 is rotated over the range in which the outflow-holes 56 and 57 change from their fully open condition to their fully closed condition, the ink having passed to the liquid chamber 55 through the ink pipe 13 can be supplied at a desired flow rate to the head units 4Y-4B and 4Y'-4B' through the ink pipes 15 and 15'. That is, the supply of ink to two head units effecting discharge of the ink of the same color can be accomplished at an optimum flow rate suited for the characteristic of the heads of such head units. Further, when the ink pipe 13 has been removed for maintenance or check-up, if the change-over valve 52 is rotated so that both of the outflow holes 56 and 57 become fully closed, the backflow of the ink from the head unit side through ink pipes 15, 15' can be prevented.

According to the present invention, as has been described above, in effecting liquid supply under the predetermined pressure by the pump as pressurizing means in the supply system for supplying liquid such as ink, use is made of a combination of a check valve having a high checking characteristic and a check valve having a small resistance in the forward direction, whereby both during the normal liquid supply and during the liquid supply under the pressure by the pump, proper liquid supply to the portion to be supplied with liquid can always be accomplished.

Also, in the liquid supply apparatus designed such that the liquid surface of the main tank storing therein the liquid to be supplied to the portion to be supplied with the liquid is kept at a predetermined level by supplying liquid from the supplemental tank, the liquid passage through which liquid is supplied from the supplemental tank to the main tank is constructed separately from the air passage which communicates the supplemental tank with the main tank and therefore, in the compler constituting the liquid passage from the supplemental tank to the main tank, only ink is circulated and thus, the diameter of that passage can be minimized. The stroke of the coupler when the supplemental tank is inserted into the main tank can also be minimized, and an evil such as a great deal of liquid adhering to such coupled portion during the mounting or dismounting of the supplemental tank with respect to the main tank can be avoided. Further, since the tip end of the coupler of the supplemental tank is not in contact with the liquid surface in the main tank, it never happens that a great deal of liquid adheres to the tip end of the coupler when the supplemental tank is removed. Furthermore, the diameter of the hole of the coupler can be made small as described above and therefore, due to the surface tension of the liquid, any residual liquid does not drop from the tip end of the coupler when the supplemental tank is remove. Accordingly, the operator's hands are not stained during the mounting or dismounting of the supplemental tank as has heretofore been experienced, and the operability of the mounting and dismounting work of the supplemental tank can be improved remarkably.

What we claim is:

1. A liquid jet recording apparatus comprising:
   a recording head;
   means for guiding a medium on which recording is carried out to enable recording thereon by said recording head; and
   a liquid supply system including a reservoir for storing liquid, pumping means for supplying liquid under pressure from said reservoir to said recording head, a first liquid passage for enabling communication with said reservoir, a second liquid passage for enabling communication between said reservoir and said pumping means, first valve means disposed in said first liquid passage for restricting flow of liquid therein toward said reservoir, said first valve means having a predetermined resistance to flow in a direction away from said reservoir, and second valve means in said second liquid passage for restricting flow of liquid therein toward said reservoir, said second valve means having a predetermined resistance to flow in a direction away from said reservoir, said predetermined resistance to flow of said first valve means being smaller than that of said second valve means.

2. A liquid jet apparatus according to claim 1, wherein said reservoir includes:
   a liquid chamber for storing liquid;
   a container chamber above said liquid chamber for accepting therein a supplemental liquid tank for storing liquid;
   a first communication passage for enabling communication between said liquid chamber and the atmosphere;
   a supply port for engaging the supplemental liquid tank when the supplemental liquid tank is accepted in said container chamber to enable said liquid chmaber to be replenished with liquid in the supplemental liquid tank; and
   a second communication passage disposed outside said container chamber for enabling communication between the supplemental liquid tank and said liquid chamber when the supplemental liquid tank is accepted in said container chamber.

3. A liquid jet recording apparatus according to claim 1, wherein said recording head is a scanning type.

4. A liquid jet recording apparatus according to claim 1, wherein said recording head includes a plurality of recording head units provided for liquids of different colors, respectively.

5. A liquid jet recording apparatus according to claim 4, wherein each said recording head unit includes a plurality of ports for discharging liquid.

6. A liquid jet recording apparatus according to claim 1, further comprising a distributor provided in a liquid supply passage to said recording head from said reservoir for distributing liquid supplied to said distributor.

7. A liquid jet recording apparatus comprising:
   a recording head;
   a liquid supply system including a liquid chamber for storing liquid, a container chamber above said liquid chamber accepting therein a supplemental liquid tank for storing liquid, a first communication passage for enabling communication between said liquid chamber and the atmosphere, a supply port for engaging the supplemental liquid tank to enable said liquid chamber to be replenished with liquid in the supplemental liquid tank, and a second communication passage disposed outside said container chamber for enabling communication between the supplemental liquid tank and said liquid chamber; and
   a liquid flow passage for enabling communication between said recording head and said liquid chamber.

8. A liquid jet recording apparatus according to claim 7, wherein said recording head is a scanning type.

9. A liquid jet recording apparatus according to claim 7, wherein said recording head includes a plurality of recording head units provided for liquids of different colors, respectively.

10. A liquid jet recording apparatus according to claim 9, wherein each said recording head unit includes a plurality of ports for discharging liquid.

11. A liquid jet recording apparatus according to claim 7, further comprising a distributor provided in said liquid flow passage supplied to said distributor.

12. A liquid supply apparatus comprising:
a liquid chamber for storing liquid;
a container chamber above said liquid chamber accepting therein a supplemental liquid tank for storing liquid;
a first communication passage for enabling communication between said liquid chamber and the atmosphere;
a supply port for engaging the supplemental liquid tank to enable said liquid chamber to be replenished with liquid in the supplemental liquid tank; and
a second communication passage disposed outside said container chamber for enabling communication between the supplemental liquid tank and said liquid chamber.

13. A liquid supply apparatus comprising:
a reservoir for storing liquid;
pumping means for supplying liquid under pressure from said reservoir;
a first liquid passage for enabling communication with said reservoir;
a second liquid passage for enabling communication between said reservoir and said pumping means;
first valve means disposed in said first liquid passage for restricting flow of liquid therein toward said reservoir, said first valve means having a predetermined resistance to flow in a direction away from said reservoir; and
second valve means in said second liquid passage for restricting flow of liquid therein toward said reservoir, said second valve means having a predetermined resistance to flow in a direction away from said reservoir, said predetermined resistance to flow of said first valve means being smaller than that of said second valve means.

14. A liquid supply apparatus according to claim 13, wherein said second valve means is a duck bill type check valve.

15. A liquid supply apparatus according to claim 13, wherein said pumping means communicates with a third liquid passage for enabling communication with said reservoir through said first valve means.

16. A liquid supply apparatus according to claim 13, wherein third valve means is disposed in said third liquid passage between said first valve means and said pumping means for restricting flow of liquid in said third liquid passage toward said pumping means.

17. A liquid supply apparatus according to claim 13, wherein said reservoir includes:
a liquid chamber for storing liquid;
a container chamber above said liquid chamber for accepting therein a supplemental liquid tank for storing liquid;
a first communication passage for enabling communication between said liquid chamber and the atmosphere;
a supply port for engaging the supplemental liquid tank when the supplemental liquid tank is accepted in said container chamber to enable said liquid chamber to be replenished with liquid in the supplemental liquid tank; and
a second communication passage disposed outside said container chamber for enabling communication between the supplemental liquid tank and said liquid chamber when the supplemental liquid tank is accepted in said container chamber.

* * * * *

UNITED STATES PATENT AND TRADEMARK OFFICE
CERTIFICATE OF CORRECTION

PATENT NO. : 4,623,905                  Page 1 of 2
DATED       : November 18, 1986
INVENTOR(S) : HIROO ICHIHASHI, ET AL.

It is certified that error appears in the above-identified patent and that said Letters Patent is hereby corrected as shown below:

COLUMN 1

Line 31,   "although," should read --, although--.
    Line 42,   "effect" should be deleted.

COLUMN 3

Line 9,    "stering" should read --storing--.

COLUMN 5

Line 42,   "o-rings" should read --O-rings--.

COLUMN 6

Line 44,   "neither" should read --never--.

COLUMN 7

Line 37,   "417 providing" should read --417, providing--.
    Line 50,   "127" should read --127,--.
    Line 61,   "duck hill" should read --duck bill--.

COLUMN 9

Line 40,   "compler" should read --coupler--.
    Line 57,   "remove." should read --removed.--

COLUMN 10

Line 19,   "jet apparatus" should read --jet recording apparatus--.
    Line 31,   "chmaber" should read --chamber--.

UNITED STATES PATENT AND TRADEMARK OFFICE
CERTIFICATE OF CORRECTION

PATENT NO. : 4,623,905

DATED : November 18, 1986

INVENTOR(S) : HIROO ICHIHASHI, ET AL.

It is certified that error appears in the above-identified patent and that said Letters Patent is hereby corrected as shown below:

COLUMN 11

Line 13, "supplied to said distributor" should read --for distributing liquid supplied to said distributor--.

COLUMN 12

Line 17, "claim 13" should read --claim 15--.

Signed and Sealed this

Twenty-second Day of September, 1987

Attest:

DONALD J. QUIGG

Attesting Officer     Commissioner of Patents and Trademarks